US010184086B2

(12) United States Patent
Wang et al.

(10) Patent No.: US 10,184,086 B2
(45) Date of Patent: Jan. 22, 2019

(54) METHOD AND ARTICLE FOR CRACKING HYDROCARBON, AND METHOD FOR PROTECTING ARTICLE AGAINST COKING DURING HYDROCARBON CRACKING

(71) Applicant: General Electric Company, Schenectady, NY (US)

(72) Inventors: Shizhong Wang, Shanghai (CN); Wusheng Xu, Shanghai (CN); Hong Zhou, Shanghai (CN); Lawrence B Kool, Niskayuna, NY (US); Wenqing Peng, Shangahi (CN); Yanfei Gu, Shanghai (CN); Jeffrey E Castor, Trevose, PA (US); Patrick Jean Lucas, Saint Thibault des vignes (FR); Raymon Barlow, The Woodlands, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/456,043

(22) Filed: Mar. 10, 2017

(65) Prior Publication Data

US 2017/0260460 A1    Sep. 14, 2017

Related U.S. Application Data

(63) Continuation of application No. 62/307,605, filed on Mar. 14, 2016.

(51) Int. Cl.
*C10G 11/04* (2006.01)
*C10G 75/00* (2006.01)
(Continued)

(52) U.S. Cl.
CPC ............... *C10G 11/04* (2013.01); *B01J 23/02* (2013.01); *B01J 23/78* (2013.01); *C10G 75/00* (2013.01); *C10G 2300/708* (2013.01)

(58) Field of Classification Search
CPC .. C10G 11/04; C10G 75/00; C10G 2300/708; B01J 23/78; B01J 23/02
See application file for complete search history.

(56) References Cited

U.S. PATENT DOCUMENTS

| 4,692,313 A | 9/1987 | Watanabe et al. |
| 6,337,459 B1 | 1/2002 | Terwijn et al. |

(Continued)

FOREIGN PATENT DOCUMENTS

| CN | 102899067 A | | 1/2013 |
| CN | 102899067 | * | 3/2015 |
| WO | 2012161873 A1 | | 11/2012 |

OTHER PUBLICATIONS

Liu et al., "Enhancing Flow Boiling and Antifouling With Nanometer Titanium Dioxide Coating Surfaces", Fluid Mechanics and Transport Phenomena, vol. 53, Issue 5, pp. 1075-1085, May 2007.

*Primary Examiner* — Randy Boyer
*Assistant Examiner* — Juan C Valencia
(74) *Attorney, Agent, or Firm* — Wegman, Hessler & Vanderburg (57) ABSTRACT

A method for cracking hydrocarbon includes providing a feedstock comprising steam and hydrocarbon, and feeding the feedstock into a device having an inner surface accessible to the feedstock. The inner surface includes a compound of formula $A_{n+1}B_nO_{3n+1}$, wherein A includes at least one alkaline earth metal, B includes at least one transition metal, O is oxygen, and $1 \leq n \leq 20$.

16 Claims, 5 Drawing Sheets

(51) Int. Cl.
*B01J 23/02* (2006.01)
*B01J 23/78* (2006.01)

(56) References Cited

U.S. PATENT DOCUMENTS

| | | |
|---|---|---|
| 6,537,388 B1 | 3/2003 | Wynns et al. |
| 8,057,707 B2 | 11/2011 | Srinivas et al. |
| 8,808,867 B2 | 8/2014 | Chun et al. |
| 8,906,511 B2 | 12/2014 | Chun et al. |
| 9,011,791 B2 | 4/2015 | Olver et al. |
| 9,499,747 B2 * | 11/2016 | Wang ................ B01J 19/0026 |
| 2002/0122756 A1 | 9/2002 | Paulson et al. |
| 2004/0188323 A1 | 9/2004 | Tzatzov et al. |
| 2006/0127700 A1 | 6/2006 | Jo et al. |
| 2009/0152172 A1 | 6/2009 | Huang |
| 2011/0295051 A1 | 12/2011 | Wang et al. |

* cited by examiner

METHOD AND ARTICLE FOR CRACKING HYDROCARBON, AND METHOD FOR PROTECTING ARTICLE AGAINST COKING DURING HYDROCARBON CRACKING

BACKGROUND

The present disclosure relates generally to methods and articles for cracking hydrocarbon. More specifically, the present disclosure relates to methods and articles for cracking hydrocarbon, in which the build-up of coke deposits are undesirable, and methods for protecting articles against coking during hydrocarbon cracking.

In the petrochemical industry, hydrocarbons such as ethane, propane, butane and naphtha are cracked in reactors, in the presence of from about 30 to 70 weight percentage of steam, at temperatures of from about 700° C. to 870° C. in order to produce light olefins such as ethylene and propylene. Sometimes, hydrocarbons such as bottoms from atmospheric and vacuum distillation of crude oil are cracked in reactors at a temperature in a range from about 480° C. to about 600° C. in the presence of about 1 wt % to about 2 wt % steam.

During hydrocarbon cracking processes, the build-up of carbonaceous deposits (i.e. coke deposits) usually happens on inner surfaces of reactor components, for instance, inner radiant tube surfaces of furnace equipment. The inner radiant tube surfaces become gradually coated with a layer of coke which raises the radiant tube metal temperature (TMT) and increases the temperature drop through radiant coils. In addition, coke build-up adversely affects the physical characteristics of the reactor components, such as the radiant tubes, by deteriorating mechanical properties such as stress rupture, thermal fatigue, and ductility.

In order to decoke reactor components, the reactor must be periodically shut down. Typically, the decoking is carried out by combustion of the coke deposits with steam/air at temperatures of up to 1000° C. Such decoking operations are required approximately every 10 to 80 days, depending on the operation mode, types of hydrocarbons and hydrocarbons throughput, and result in production loss since hydrocarbons feeding must be stopped for such decoking operation.

A variety of methods have been considered in order to overcome the disadvantages of coke build-up on reactor components, such as furnace tube inner surfaces. These approaches include: metallurgy upgrade to alloys with increased chromium content of the metal substrates used in the furnaces; adding additives such as sulfur, dimethyl sulfide (DMS), dimethyl disulfide (DMDS) or hydrogen sulfide to the feedstock; increasing steam dilution of feedstock, and improved process control; selectively pre-treating the inner surface of the coils; inert surface coating; and catalytic gasification of coke to produce $CO/CO_2$ and hydrogen.

While some of the aforementioned methods and systems have general use in the petrochemical industry, it is desirable to provide a method and article that obviates and mitigates the shortcomings of the prior art and successfully reduces or eliminates the build-up of coke deposits.

BRIEF DESCRIPTION

In one aspect, a method for cracking hydrocarbon includes providing a feedstock comprising steam and hydrocarbon, and feeding the feedstock into a device having an inner surface accessible to the feedstock. The inner surface includes a compound of formula $A_{n+1}B_nO_{3n+1}$, wherein A includes at least one alkaline earth metal, B includes at least one transition metal, O is oxygen, and $1 \leq n \leq 20$.

In another aspect, a method for protecting a surface of an article against coking resulting from exposure to a hydrocarbon containing steam processed in hydrocarbon cracking, includes coating the surface with an anti-coking material including a compound of formula $A_{n+1}B_nO_{3n+1}$, wherein A includes at least one alkaline earth metal, B includes at least one transition metal, O is oxygen, and $1 \leq n \leq 20$.

In another aspect, an article for cracking hydrocarbon includes a surface accessible to the hydrocarbon, and an anti-coking coating deposited on the surface. The anti-coking coating includes a compound of formula $A_{n+1}B_nO_{3n+1}$, wherein A includes at least one alkaline earth metal, B includes at least one transition metal, O is oxygen, and $1 \leq n \leq 20$.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

One or more embodiments of the present disclosure will be described below. Unless defined otherwise, technical and scientific terms used herein have the same meaning as is commonly understood by one of skill in the art to which this invention belongs. The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. Additionally, when using an expression of "about a first value—a second value," the about is intended to modify both values. In at least some instances, the approximating language may correspond to the precision of an instrument for measuring the value. Here, and throughout the specification and claims, range limitations may be combined and/or interchanged, such ranges are identified and include all the sub-ranges contained therein unless context or language indicates otherwise.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Embodiments of the present disclosure relate to a method for reducing or eliminating build-up of coke deposits on a metallic surface exposed to a hydrocarbon containing steam processed in a hydrocarbon cracking process. The method involves an anti-coking catalyst material which has high anti-coking performance and can be applied onto a surface of an article, such as a surface of a high temperature petrochemical pipeline, to form an anti-coking coating. Such a method is particularly applicable for cracking hydrocarbon systems, in which the build-up of coke deposits are undesirable.

As used herein, the term "cracking hydrocarbon" refers to but is not limited to processes in which hydrocarbons such as ethane, propane, butane and naphtha are cracked in reactors, in the presence of from about 30 to 70 weight percentage of steam, at temperatures of from about 700° C. to 870° C. in order to produce light olefins such as ethylene and propylene. Sometimes, hydrocarbons such as bottoms from atmospheric and vacuum distillation of crude oil are cracked in reactors at a temperature in a range from about 480° C. to about 600° C. in the presence of about 1 to 2 weight percentage of steam. The term "coke" refers to but is not limited to carbonaceous solid or liquid or particulates or macromolecules forming the carbonaceous solid or liquid, which are derived from coal, petroleum, wood, hydrocarbons and other materials containing carbon and which include, for example, carbon black, tar, and pyrolytic coke existing in hydrocarbon cracking furnace.

The anti-coking catalyst material may include a complex oxide, which has at least one alkaline earth metal element hosted in a crystal lattice thereof. As used herein, the term "complex oxide" refers to a chemical compound that includes oxygen and at least two other elements. In some embodiments, the complex oxide has formula of $A_{n+1}B_nO_{3n+1}$, wherein A includes at least one alkaline earth metal, B includes at least one transition metal, O is oxygen, and $1 \leq n \leq 20$. The complex oxide $A_{n+1}B_nO_{3n+1}$ may have a perovskite-like structure, in which the presence of layers, stacks, or frameworks made up of octahedra are linked at vertices thereof. In particular, the complex oxide $A_{n+1}B_nO_{3n+1}$ refers to a compound with layered-perovskite structure, named as "Ruddlesden-Popper phase", in which perovskites with a $ABO_3$ structure are separated by thin sheets of intrusive material and the intruding layer occurs between every n layers of the perovskite lattice.

In some embodiments, A of the formula $A_{n+1}B_nO_{3n+1}$ includes strontium (Sr). In some specific embodiments, A of the formula $A_{n+1}B_nO_{3n+1}$ A includes Sr and an A-site dopant comprising at least one rare-earth metal. In some embodiments, B of the formula $A_{n+1}B_nO_{3n+1}$ includes titanium (Ti). In some embodiments, in the formula $A_{n+1}B_bO_{3n+1}$, A includes Sr, B includes Ti, and n is 1 or 2. Some examples of $A_{n+1}B_nO_{3n+1}$ include $Sr_{(3-x)}X_xTi_{(2-y)}Y_yO_7$ and $Sr_{(2-x')}X_{x'}Ti_{(1-y')}Y_{y'}O_4$, wherein X includes at least one alkaline earth metal, Y includes at least one transition metal, $0 \leq x < 3$, $0 \leq y < 2$, $0 \leq x' < 2$ and $0 \leq y' < 1$. It is generally known that the stoichiometry of O may have some variation depending on an oxygen partial pressure. Some specific examples of $Sr_{(3-x)}X_xTi_{(2-y)}Y_yO_7$ include $Sr_3Ti_2O_7$ and $Sr_3Ti_{1.86}Fe_{0.14}O_{6.93}$. Some specific examples of $Sr_{(2-x)}X_xTi_{(1-y)}Y_yO_4$ include $Sr_2TiO_4$ and $Sr_2Ti_{0.93}Fe_{0.07}O_4$.

As used herein, the term "transition metal" refers to a chemical element in Group 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg). The term "alkaline earth metal" refers to a chemical element in Group 2 of the periodic table, including beryllium (Be), magnesium (Mg), calcium (Ca), strontium (Sr), barium (Ba), and radium (Ra). The term "rare-earth metal" refers to any of a collection of seventeen chemical elements in the periodic table, including scandium (Sc), yttrium (Y), fifteenth lanthanides and any combination thereof. The fifteenth lanthanides include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The anti-coking property of the compound $A_{n+1}B_nO_{3n+1}$ may be related to its water uptake capacity and catalytic activity for coke combustion in a hydrocarbon cracking environment. The compound $A_{n+1}B_nO_{3n+1}$ and a coating thereof may have a capacity to absorb water, and a capacity to initiate or accelerate coke combustion reaction without itself being affected. In some embodiments, the capacity to initiate or accelerate coke combustion reaction is realized by reducing an ignition temperature of the coke combustion and/or increasing the coke combustion rate.

In use, the compound $A_{n+1}B_nO_{3n+1}$ usually is applied as anti-coking catalyst material onto a metallic substrate of an article to form an anti-coking coating. As the coating is usually formed at a temperature close to the melting point of the catalyst material, it is challenging to coat the catalyst material to a metallic substrate with a maximum temperature tolerance limit lower than the melting point of the catalyst material. Therefore, an inorganic binder may be used to help binding the catalyst material together to form the coating. In some embodiments, the coating further includes an inorganic binder which enables the catalyst material to be coated on the metallic substrate at a temperature lower than the melting point of the catalyst material. With the inorganic binder, the catalyst material can be coated on the metallic substrate at a relatively lower temperature, for example, below about 600° C. It is challenging to find the appropriate binder to get a robust catalyst coating while maintaining the good anti-coking performance of the catalyst. The chemical compatibility between the binder and the catalyst, and that between the binder and substrate may be considered. Moreover, the species of the binder, the concentration of the binder, and the sintering temperature of the coating may be designed to avoid negative effects on the catalytic activity of the catalyst coating.

In some embodiments, the inorganic binder includes a phosphate salt, a silicate, a nano particle colloid, or a combination thereof. In some specific embodiments, the inorganic binder includes a phosphate salt. As used herein, the term "phosphate salt" refers to an inorganic compound containing an anionic phosphate cluster $PO_x$, such as phosphate ion ($PO_4^{3-}$), hydrogen phosphate ion ($HPO_4^{2-}$), or dihydrogen phosphate ion ($H_2PO_4^-$). The term "silicate" refers to an inorganic compound containing an anionic silicon cluster $SiO_x$, such as $SiO_3^{2-}$ and $SiO_4^{4-}$. The term "nano particle colloid" refers to a colloidal solution, which includes a dispersoid including nano size particles, and a dispersion medium such as water, an organic solvent, or a combination thereof. In some embodiments, the nano particle colloid is a nano oxide colloid, which includes nano size particles of an inorganic oxide as the dispersoid. Inorganic oxides usable herein include, but are not limited to, silicon dioxide ($SiO_2$) and cerium oxide ($CeO_2$). In some particular embodiments, the inorganic binder includes aluminium dihydrogen phosphate ($Al(H_2PO_4)_3$), aluminum hydrogen phosphate ($Al_2(HPO_4)_3$), aluminum phosphate ($Al.n(PO_x)$), potassium silicate (K—Si—O, such as $K_2SiO_3$ or $K_4SiO_4$), sodium silicate (Na—Si—O, such as $Na_2SiO_3$ or $Na_4SiO_4$), nano $SiO_2$ colloid, nano $CeO_2$ colloid, or a combination thereof. With the inorganic binder, an anti-coking coating with good uniformity and mechanical strength can be obtained at a relatively lower temperature. Moreover, the inorganic binder contained in the coating has no issue of accelerating coke deposition, and the coating maintains good catalytic activity.

In some embodiments, a weight percentage of the inorganic binder relative to the coating is in a range from about 1 weight percent to about 90 weight percent, and a weight percentage of the anti-coking catalyst relative to the coating is in a range from about 10 weight percent to about 99 weight percent.

Embodiments of the present disclosure also relate to a method for protecting an article against coking resulting from exposure to a hydrocarbon containing steam in a hydrocarbon cracking environment, by forming an aforementioned anti-coking coating on the article. In the method, the catalyst material and optionally, the inorganic binder may be prepared into a slurry, and then the slurry may be applied to a surface of the article which is exposure to the hydrocarbon containing steam, by an applicable coating process, for example, a wet-chemical deposition process. The article applied with the slurry may be dried to obtain a coated article. The coated article may be calcined or sintered. Thus an anti-coking coating can be formed on a substrate of the article. In some embodiments, the calcining or sintering is carried out at a relatively lower temperature, for example, at a temperature below about 900° C. In some specific embodiments, the calcining or sintering is carried out at a temperature in a range from about 300° C. to about 900° C., or preferably in a range from about 300° C. to about 600° C.

As used herein, the term "slurry" refers to a fluid mixture of a solid (usually pulverized solid) with a liquid. Slurries may behave in some ways like thick fluids, flowing under gravity but are also capable of being pumped if it is not too thick. The term "wet-chemical deposition" refers to liquid-based coating methods involving the application of a liquid precursor film on a substrate that is then converted to the desired coating by subsequent post-treatment steps. Some examples of wet-chemical deposition methods include dip coating methods, spin coating methods, spray coating methods, die coating methods, and screen printing methods.

The slurry may further include a solvent. The solvent may include water, an alcohol or a combination thereof. Some examples of suitable alcohols include methanol, ethanol and n-butanol. In some embodiments, the inorganic binder includes $K_2SiO_3$ or $Na_2SiO_3$ and the solvent includes water.

In some embodiments, the inorganic binder includes a phosphate salt such as $Al.n(PO_x)$ and the solvent includes alcohol. In some embodiments, a weight percentage of the anti-coking catalyst relative to the slurry is in a range from about 30 weight percent to about 60 weight percent, and a weight percentage of the inorganic binder relative to the slurry is in a range from about 2 weight percent to about 15 weight percent. The slurry may further include a dispersant or a dispersing agent for improving separation of solid particles in the slurry. The slurry may further include an organic binder such as polyvinyl butyral (PVB). During the subsequent process of coating formation, organics in the slurry, such as the solvent, the dispersant and/or the organic binder, may be "burned" off depending on the temperature that slurry reaches during the coating formation.

In some embodiments, the slurry may be applied to an inner surface of a pipe-like article such as a radiant coil in a steam cracker for producing ethylene, by a painting pig that fits closely inside the coil. The quantity of the slurry may be calculated according to the desired coating thickness. In a specific embodiment, an excess quantity of the slurry is filled into the coil, and then the painting pig is inserted into the coil. The pig is shaped and sized to be able to move within the coil and yet allow for an appropriate thickness of the slurry to be applied to the inner surface of the coil. Movement of the pig may be accomplished by an air pressure. The pig is propelled through the coil and spreads the slurry evenly through the inner surface of the coil.

Embodiments of the present disclosure also relate to an article applied with an anti-coking coating as described herein above. The article may include a metallic substrate and an aforementioned anti-coking coating deposited on the metallic substrate. The metallic substrate may be made from any suitable metals or alloys, including but not limited to iron based alloy, cobalt based alloy, nickel based alloy, or a combination thereof. The anti-coking coating may be of any practical thickness as is commonly used for achieving the anti-coking ability. In some embodiments, the anti-coking coating has a thickness of about 1-200 um. The anti-coking coating may be applied by a process as described herein above. The article may be any component including a surface exposure to a hydrocarbon containing steam in a hydrocarbon cracking environment, and the anti-coking coating is deposited at least on the surface exposure to the hydrocarbon containing steam. In some embodiments, the article is a radiant coil used in a steam cracker for producing ethylene.

The embodiments of the present disclosure are demonstrated with reference to a non-limiting example. The following example is set forth to provide those of ordinary skill in the art with a detailed description of how the materials and methods claimed herein are evaluated, and is not intended to limit the scope of what the inventors regard as their invention. Unless specified otherwise, all of the materials or components are commercially available from common chemical suppliers.

Example

In this example, several complex oxides, including perovskite like compounds $Sr_2TiO_4$, $Sr_3Ti_2O_7$, $Sr_3Ti_{1.86}Fe_{0.14}O_{6.93}$, and a standard perovskite $SrTiO_3$ were prepared, tested and compared. These complex oxides were prepared from raw materials $SrCO_3$, $TiO_2$ and $Fe_2O_3$, all of which were purchased from Sinopharm Chemical Reagent Co., Ltd (SCRC) and have a purity of about 99.99%. The raw materials, weighted according to each of the chemical formulas of $Sr_2TiO_4$, $Sr_3Ti_2O_7$, $Sr_3Ti_{1.86}Fe_{0.14}O_{6.93}$ and $SrTiO_3$, were mixed completely in a container. Then the mixed materials for each chemical formula were transferred to an alumina crucible and sintered at about 1500° C. for about 6 hours in air in a muffle furnace, to obtain the corresponding complex oxide powder. The powder was iso-statically pressed at about 274.6 MPa for 10 minutes to become a rod. The rod was then sintered at about 1400° C. for about 6 hours in air. In this way, rods made from each of the complex oxides $Sr_2TiO_4$, $Sr_3Ti_2O_7$, $Sr_3Ti_{1.86}Fe_{0.14}O_{6.93}$ and $SrTiO_3$ can be obtained. The obtained rods were used as catalyst samples and subjected to a cracking test.

In the cracking test, the samples were put into a lab scale hydrocarbon-cracking tube furnace, in which they were heated in argon (Ar) gas flow. When the furnace temperature increased to 870° C., the Ar flowing was stopped, and instead, a vapor mixture of heptane and water is fed into the tube furnace with a controlled mass flow which can ensure a residence time of feedstock (the vapor mixture) in the tube furnace at about 2 seconds. The vapor mixture was obtained by pumping heptane (purchased from SCRC) and deionized water at 1:1 weight ratio into a chamber to get a mixture and heating the mixture to about 350° C. for vaporization. The temperature was kept at about 870° C. for about 2 hours. Then the feeding of the vapor mixture was stopped and Ar flowing was resumed to cool down the tube furnace. When the tube furnace was cooled down, the samples were taken out for analysis.

The samples were identified with an X-ray diffraction machine (D8 Advance, Bruker AXS GmbH, Karlsruhe, Germany), before and after the cracking test. Comparative x-ray diffraction patterns obtained before and after the cracking test as for these samples are shown in FIGS. 1-4, respectively. As shown, each of the perovskite like samples ($Sr_2TiO_4$, $Sr_3Ti_2O_7$ and $Sr_3Ti_{1.86}Fe_{0.14}O_{6.93}$) after the cracking test has an x-ray diffraction pattern substantially identical to that before the cracking test, which indicates that the perovskite like samples are stable during the cracking test. However, as for the perovskite sample ($SrTiO_3$), the two x-ray diffraction patterns obtained before and after the cracking test are different, which indicates that the perovskite sample is not stable during the cracking test.

Figure 1:
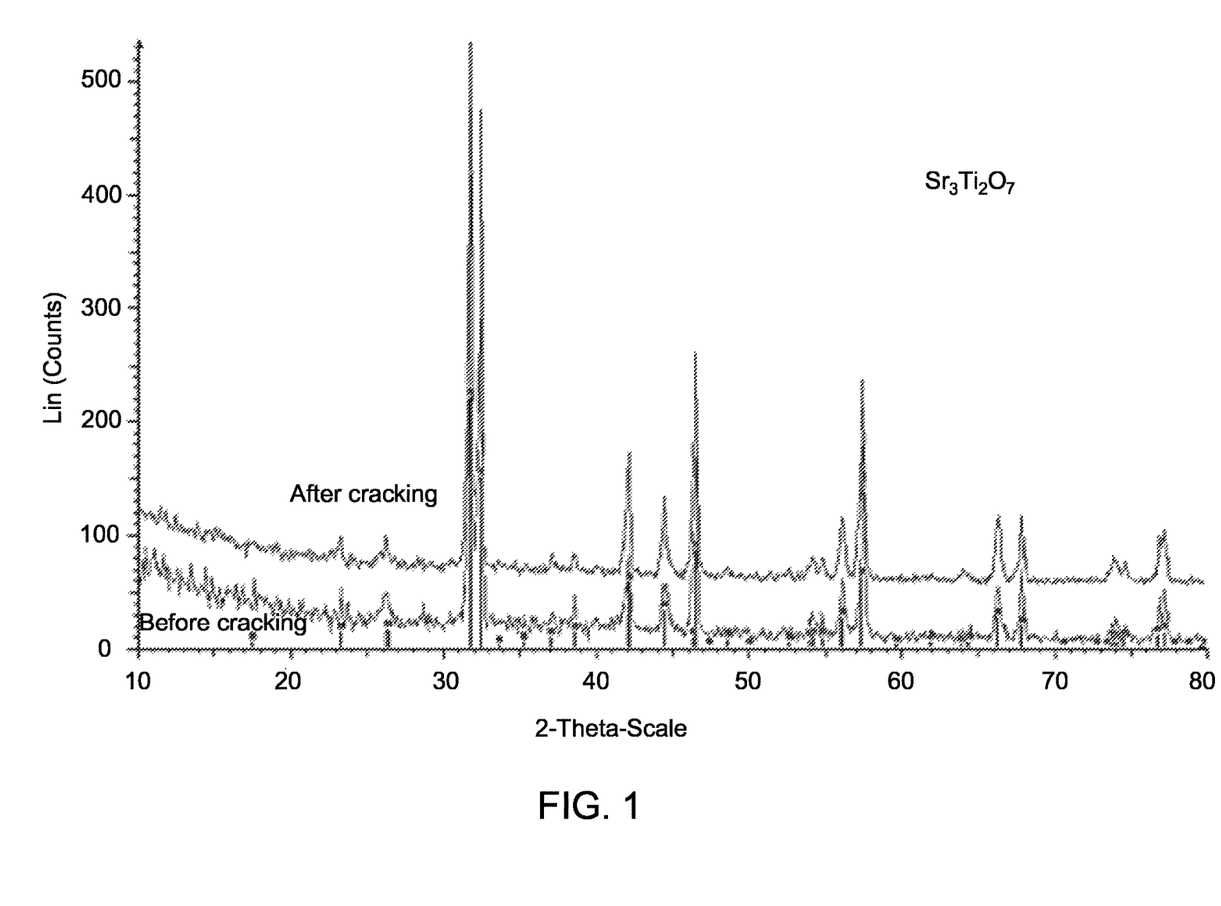
FIG. 1 is a graph showing X-ray diffraction patterns of a $Sr_3Ti_2O_7$ sample, obtained before and after a cracking test, respectively.
Figure 2:
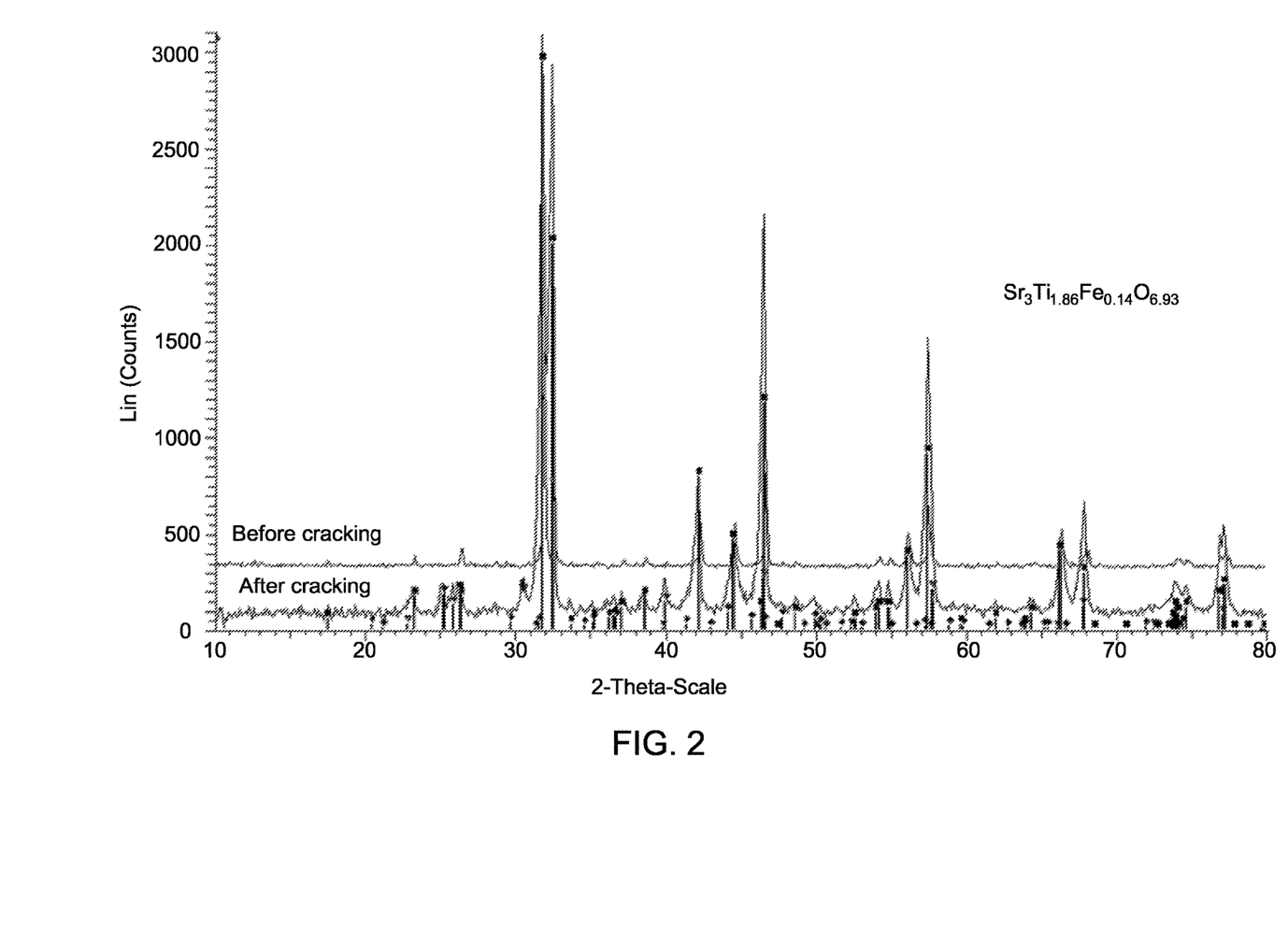
FIG. 2 is a graph showing X-ray diffraction patterns of a $Sr_3Ti_{1.86}Fe_{0.14}O_{6.93}$ sample, obtained before and after a cracking test, respectively.
Figure 3:
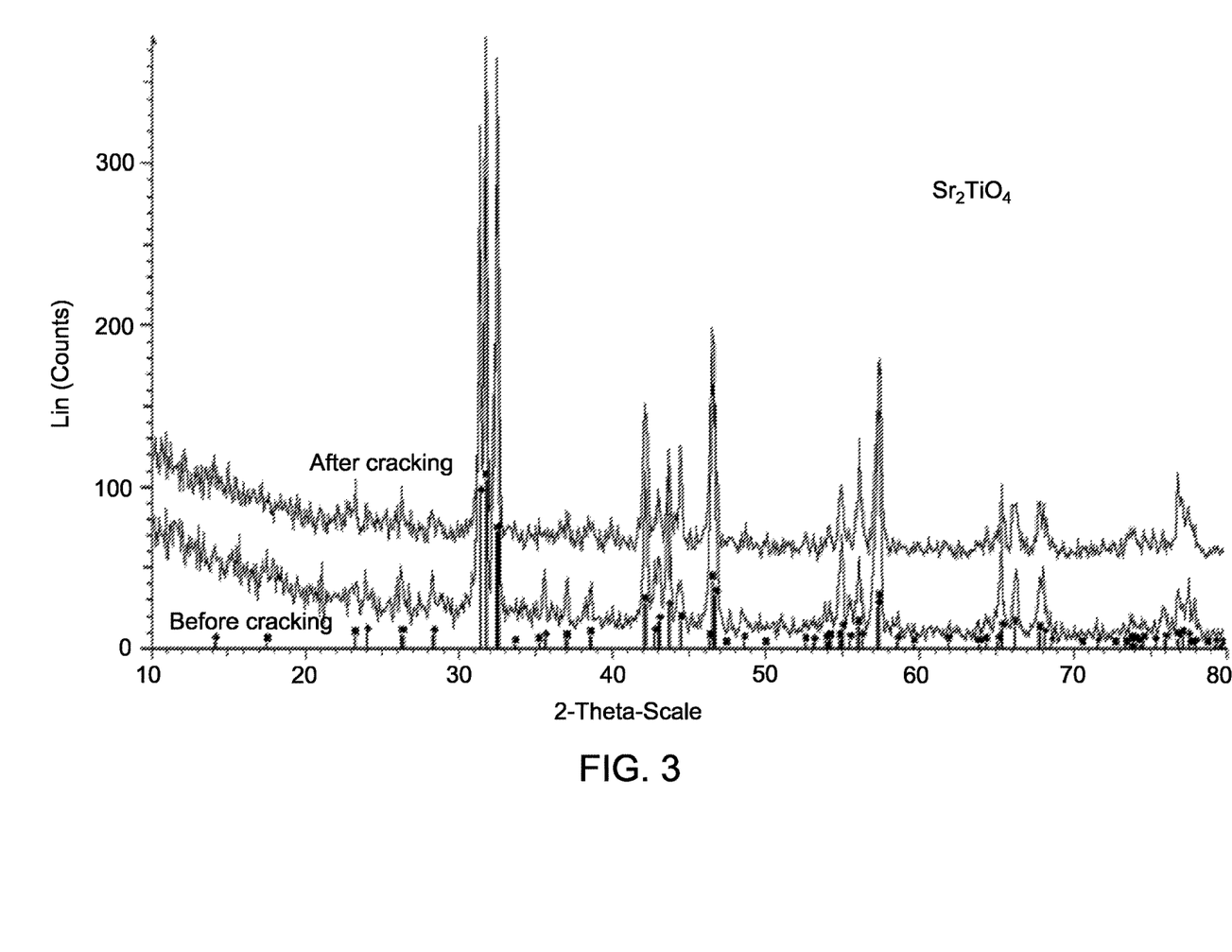
FIG. 3 is a graph showing X-ray diffraction patterns of a $Sr_2TiO_4$ sample, obtained before and after a cracking test, respectively.
Figure 4:
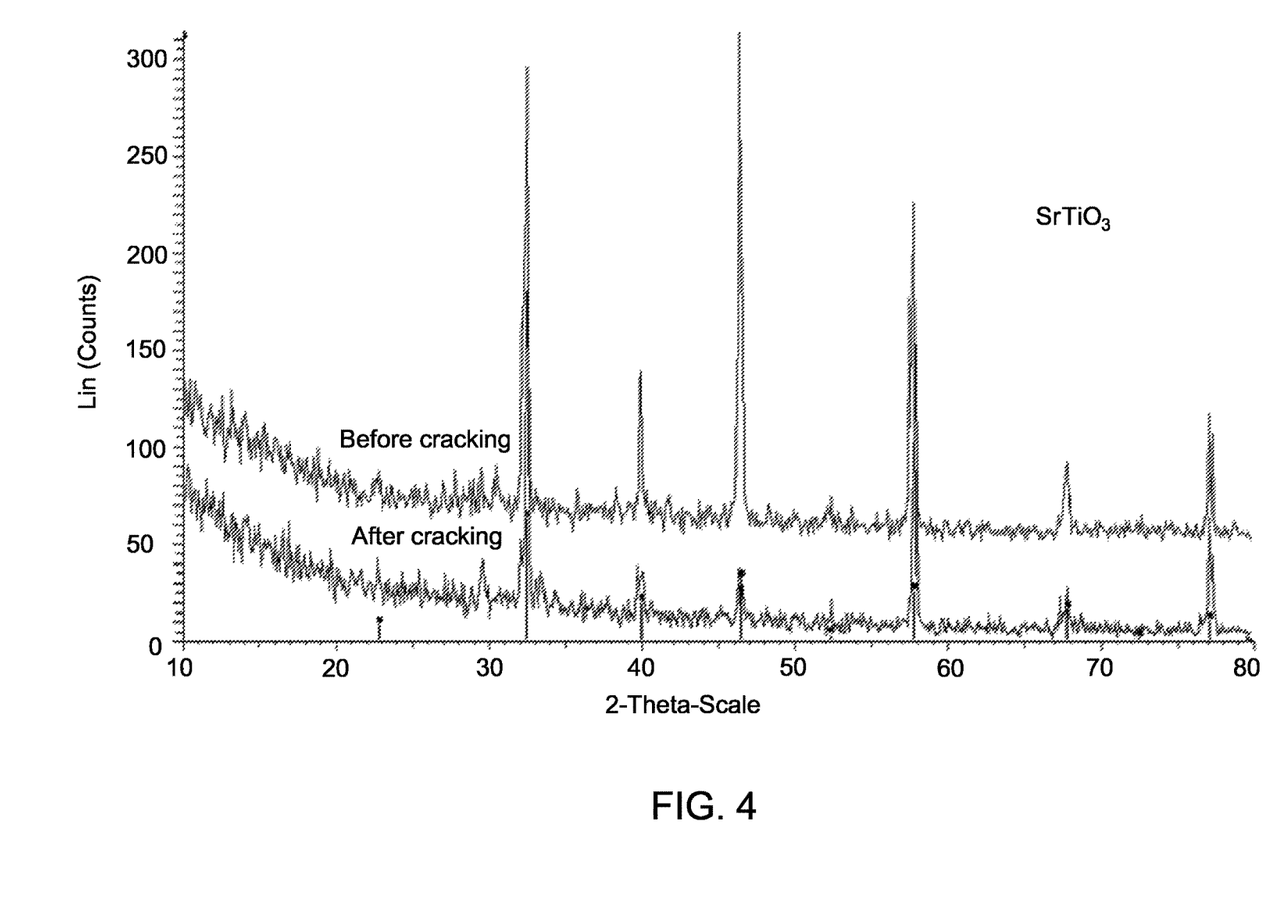
FIG. 4 is a graph showing X-ray diffraction patterns of a $SrTiO_3$ sample, obtained before and after a cracking test, respectively.
Figure 5:
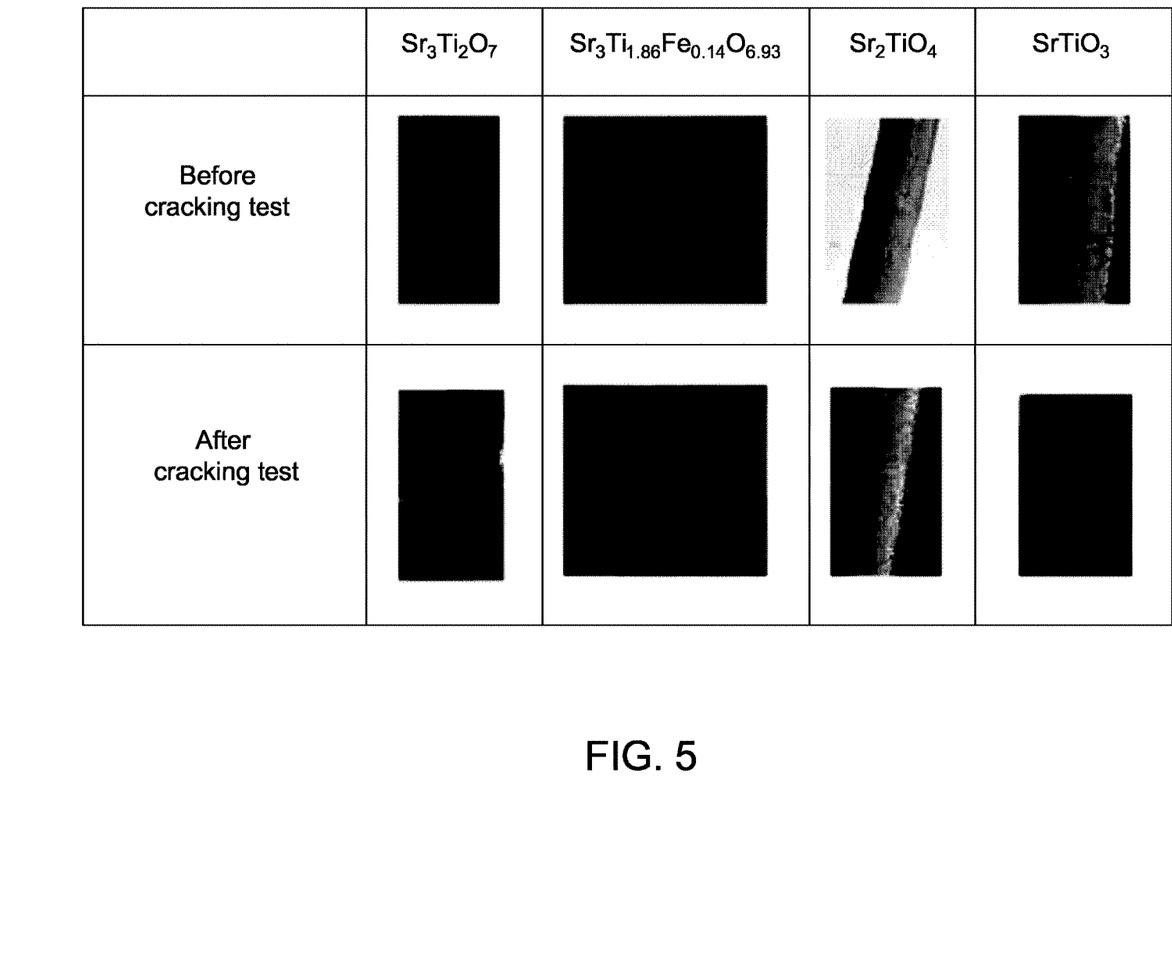
FIG. 5 shows pictures token before and after the cracking test as for the $Sr_3Ti_2O_7$, $Sr_3Ti_{1.86}Fe_{0.14}O_{6.93}$, $Sr_2TiO_4$ and $SrTiO_3$ samples.

FIG. 5 shows pictures token before and after the cracking test as for these samples. By comparing the pictures before and after the cracking test, it can be seen that there is basically no coke deposits on the perovskite like samples ($Sr_2TiO_4$, $Sr_3Ti_2O_7$ and $Sr_3Ti_{1.86}Fe_{0.14}O_{6.93}$) after the cracking test, but there is serious coking on the perovskite sample ($SrTiO_3$) after the cracking test. It indicates that the perovskite like samples are capable of inhibiting coking under the tested condition.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for cracking hydrocarbon, comprising:
   providing a feedstock comprising steam and hydrocarbon; and
   feeding the feedstock into a device having an inner surface accessible to the feedstock, the inner surface comprising a compound of formula $A_{n+1}B_nO_{3n+1}$, wherein A comprises at least one alkaline earth metal, B comprises at least one transition metal, O is oxygen, and $1 \leq n \leq 20$,
   wherein A further comprises an A-site dopant comprising at least one rare-earth metal.

2. The method of claim 1, wherein A comprises strontium (Sr).

3. The method of claim 1, wherein B comprises titanium (Ti).

4. The method of claim 1, wherein A comprises strontium (Sr), B comprises titanium (Ti), and n is 1 or 2.

5. The method of claim 1, wherein the compound of formula $A_{n+1}B_nO_{3n+1}$ is selected from $Sr_2TiO_4$, $Sr_3Ti_2O_7$, and $Sr_3Ti_{1.86}Fe_{0.14}O_{6.93}$.

6. A method for protecting a surface of an article against coking resulting from exposure to a hydrocarbon containing steam processed in cracking hydrocarbon, comprising coating the surface with an anti-coking material comprising a compound of formula $A_{n+1}BnO_{3n+1}$, wherein A comprises at least one alkaline earth metal, B comprises at least one transition metal, O is oxygen, and $1 \leq n \leq 20$,
   wherein the coating is applied by a slurry comprising the compound of formula $A_{n+1}B_nO_{3n+1}$ to the surface and drying the slurry.

7. The method of claim 6, wherein A comprises strontium (Sr).

8. The method of claim 6, wherein A further comprises an A-site dopant comprising at least one rare-earth metal.

9. The method of claim 6, wherein B comprises titanium (Ti).

10. The method of claim 6, wherein the compound of formula $A_{n+1}B_nO_{3n+1}$ is selected from $Sr_2TiO_4$, $Sr_3Ti_2O_7$, and $Sr_3Ti_{1.86}Fe_{0.14}O_{6.93}$.

11. The method of claim 6, comprising spreading the slurry onto an inner surface of the article by a painting pig propellable within the inner surface.

12. An article for cracking hydrocarbon, comprising:
   a surface accessible to the hydrocarbon; and
   an anti-coking coating deposited on the surface and comprising a compound of formula $A_{n+1}B_nO_{3n+1}$, wherein A comprises at least one alkaline earth metal, B comprises at least one transition metal, O is oxygen, and $1 \leq n \leq 20$,
   wherein A comprises strontium (Sr) and B comprises titanium (Ti).

13. The article of claim 12, wherein A further comprises an A-site dopant comprising at least one rare-earth metal.

14. The article of claim 12, wherein the compound of formula $A_{n+1}B_nO_{3n+1}$ is selected from $Sr_2TiO_4$, $Sr_3Ti_2O_7$, and $Sr_3Ti_{1.86}Fe_{0.14}O_{6.93}$.

15. The article of claim 12, wherein the anti-coking coating further comprises an inorganic binder comprising a phosphate salt, a silicate, a nano particle colloid, or a combination thereof.

16. The article of claim 12, comprising a radiant coil in a steam cracker, wherein the coating is deposited at least on an inner surface of the radiant coil.

* * * * *